US009215333B2

(12) United States Patent
Gupta (10) Patent No.: US 9,215,333 B2
(45) Date of Patent: Dec. 15, 2015

(54) CHARGING OF CALLS IN A COMMUNICATION NETWORK

(71) Applicant: Alcatel Lucent, Boulogne Billancourt (FR)

(72) Inventor: Varun Gupta, Gurgaon (IN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/374,709

(22) PCT Filed: Dec. 28, 2012

(86) PCT No.: PCT/EP2012/077047
§ 371 (c)(1),
(2) Date: Jul. 25, 2014

(87) PCT Pub. No.: WO2013/110426
PCT Pub. Date: Aug. 1, 2013

(65) Prior Publication Data
US 2015/0010137 A1    Jan. 8, 2015

(30) Foreign Application Priority Data

Jan. 27, 2012 (EP) .................................. 12305108

(51) Int. Cl.
*H04M 15/00* (2006.01)
*H04M 15/10* (2006.01)
*H04M 15/08* (2006.01)

(52) U.S. Cl.
CPC .............. *H04M 15/10* (2013.01); *H04M 15/00* (2013.01); *H04M 15/07* (2013.01); *H04M 15/08* (2013.01);

(Continued)

(58) Field of Classification Search
CPC ...... H04M 15/00; H04M 15/08; H04M 17/00; H04M 2215/62; H04W 4/24; H04W 4/12
USPC ......................... 379/114.01, 114.21–114.23
See application file for complete search history.

(56) References Cited

U.S. PATENT DOCUMENTS

| 5,381,467 A | 1/1995 | Rosinski et al. |
| 5,557,664 A | 9/1996 | Burns et al. |

(Continued)

FOREIGN PATENT DOCUMENTS

| CN | 1 773 922 A | 5/2006 |
| CN | 1893479 A | 1/2007 |

(Continued)

OTHER PUBLICATIONS

International Search Report for PCT/EP2012/077047 dated Sep. 2, 2013.

*Primary Examiner* — Quoc D Tran
(74) *Attorney, Agent, or Firm* — Fay Sharpe LLP (57) ABSTRACT

The present subject matter relates to a method for charging of calls in a communication network. The method includes, receiving subscription information pertaining to a discretionary charging feature, for a call between a first user and a second user, where the first user is subscribed to a first telecom operator and the second user is subscribed to one of the first telecom operator and a second telecom operator. The method further includes ascertaining whether the second user is subscribed to the discretionary charging feature based on the receiving, and applying discretionary charging for determining call charges for the first user, based on the ascertaining.

14 Claims, 5 Drawing Sheets

(52) U.S. Cl.
CPC .............. *H04M 15/49* (2013.01); *H04M 15/73* (2013.01); *H04M 15/735* (2013.01); *H04M 15/745* (2013.01); *H04M 15/80* (2013.01); *H04M 2215/0108* (2013.01); *H04M 2215/0168* (2013.01)

(56) References Cited

U.S. PATENT DOCUMENTS

| | | | |
|---|---|---|---|
| 5,602,907 A | 2/1997 | Hata et al. | |
| 6,373,931 B1 * | 4/2002 | Amin et al. | 379/121.01 |
| 6,397,055 B1 * | 5/2002 | McHenry et al. | 455/408 |
| 6,442,257 B1 | 8/2002 | Gundlach | |
| 6,546,238 B1 * | 4/2003 | Nightingale et al. | 455/406 |
| 6,556,818 B1 * | 4/2003 | Meehan | 455/406 |
| 8,208,895 B2 * | 6/2012 | Wieczorek | 455/406 |
| 2002/0103771 A1 | 8/2002 | Love et al. | |
| 2005/0113064 A1 | 5/2005 | Halsell | |
| 2005/0190902 A1 * | 9/2005 | Benco et al. | 379/114.21 |
| 2006/0085307 A1 | 4/2006 | Eicke et al. | |
| 2007/0201643 A1 * | 8/2007 | Eisenman et al. | 379/114.21 |
| 2009/0116628 A1 * | 5/2009 | Ropolyi | 379/114.22 |

FOREIGN PATENT DOCUMENTS

| | | |
|---|---|---|
| CN | 1996860 A | 7/2007 |
| CN | 102106142 A | 6/2011 |
| EP | 1 667 417 A1 | 6/2006 |
| JP | 6-105021 A | 4/1994 |
| JP | 7-212500 A | 8/1995 |
| JP | 10-294808 A | 11/1998 |
| JP | 2001-274926 A | 10/2001 |
| WO | WO 2004/068832 A1 | 8/2004 |
| WO | WO 2004/068833 A1 | 8/2004 |
| WO | WO 2005/111878 A1 | 11/2005 |
| WO | WO 2006/050669 A1 | 5/2006 |

* cited by examiner

CHARGING OF CALLS IN A COMMUNICATION NETWORK

FIELD OF INVENTION

The present subject matter relates to communication networks and, particularly but not exclusively, to charging of calls in the communication networks.

BACKGROUND

Communication devices, such as cellular phones, personal digital assistants, portable computers, and desktop computers, provide users with a variety of mobile communication services and computer networking capabilities. These communication services allow data in the form of text or speech, for example, voice calls, to be exchanged between the users. The users may subsequently be charged for the communication services provided by a cellular service provider or a telecom operator, based on various parameters. Examples of such parameters can be type of call, such as, originating call or terminating call, duration of call, and location of calling and called party.

Generally, when two users are on a telephonic call, the calling party may be independently charged according to a tariff plan provided by a calling operator, and the called party may be independently charged according to a tariff plan provided by a called operator. The calling operator and the called operator here, refers to the telecom operator of the calling party and the called party respectively. Further, these tariff plans may provide special tariff rates within the same telecom operator.

SUMMARY

This summary is provided to introduce concepts related to charging of calls in a communication network. This summary is not intended to identify essential features of the claimed subject matter nor is it intended for use in determining or limiting the scope of the claimed subject matter.

In one implementation, the present subject matter includes a method for charging of calls in a communication network. The method includes, receiving subscription information pertaining to a discretionary charging feature, for a call between a first user and a second user, where the first user is subscribed to a first telecom operator and the second user is subscribed to one of the first telecom operator and a second telecom operator. The method further includes ascertaining whether the second user is subscribed to the discretionary charging feature based on the receiving, and applying discretionary charging for determining call charges for the first user, based on the ascertaining.

In one implementation, the applying discretionary charging comprises re-evaluating an initially reserved charge of the first user based on the discretionary charging feature indicator and the discretionary charging feature parameter.

In another implementation, the present subject matter relates to a call charging system for charging of calls in a communication network. The system includes a processor and a memory coupled to the processor. The memory includes a call charging module configured to receive a party to charge parameter from a call charging module associated with the second user, for a call between a first user and the second user. The first user is subscribed to a first telecom operator and the second user is subscribed to one of the first telecom operator and a second telecom operator. The call charging module is further configured to ascertain whether the second user is subscribed to a discretionary charging feature based on the party to charge parameter, and apply discretionary charging for determination of call charges for the first user, based on the ascertained subscription status and the party to charge parameter.

In one implementation, the call charging module is further configured to re-evaluate an initially reserved charge for the first user based on the discretionary charging feature, and wherein the call charging module is configured to refund a predetermined amount to at least one of the first user and the second user based on the re-evaluation.

In a further implementation, the present subject matter relates to a computer-readable medium having embodied thereon a computer program for executing a method. The method includes receiving subscription information pertaining to a discretionary charging feature for a call between a first user and a second user, where the second user is subscribed to a first telecom operator. The method further includes ascertaining whether the second user is subscribed to the discretionary charging feature based on the receiving, where the first user is subscribed to one of the first telecom operator and a second telecom operator. The method also includes applying discretionary charging for determining call charges for the first user, based on the ascertaining.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

DESCRIPTION OF EMBODIMENTS

Systems and methods for charging for a call in a communication network, such as a telecommunication network are described. The systems and methods can be implemented in a variety of computing systems. The system that can implement the described method(s) include, but are not limited to, desktop computers, hand-held devices, laptops or other portable computers, mobile phones, fixed line phones, and the like. Additionally, the method can be implemented in any of the communication networks, such as Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), and IP-based network, Public Switched Telephone Network (PSTN), and Integrated Services Digital Network (ISDN).

Although the description herein is with reference to certain networks, the systems and methods may be implemented in other networks and devices, albeit with a few variations, as will be understood by a person skilled in the art.

Typically, in the communication network, a calling party makes a call to a called party. Generally, the calling party and the called party are charged independently for the call based on various parameters, such as, type of call, such as, originating call or terminating call, duration of call, and the location of the calling and the called party. Furthermore current charging mechanisms support this independent charging mechanism for both calling and called parties depending on charging policies or plans of their respective service providers. In one example, a user A calls a user B who is within his home calling area, i.e., not roaming, for the duration of 1 minute. In this case, typically, the user A will be charged according to a tariff plan to which he is subscribed, and the user B may be charged based on his tariff plans, which in this case can state that he is not to be charged since he is not roaming.

Additionally, in certain call charging mechanisms, the calling party and the called party may be charged at special or discounted rates depending on a tariff plan provided by their respective telecom operators. For example, users A, B, and C, may be subscribed to the same telecom operator. Further, the users A, B, and C, may subscribe to a tariff plan, where each of the users may make calls at discounted rates to each other for a monthly subscription fee. However, in the case where the users A, B, and C are subscribed to different telecom operators, they may not enjoy the benefits of the above mentioned call charging mechanism.

Therefore, in other words, generally the call charging mechanisms are operator specific, and borne independently by the respective subscriber without any flexibility with subscribers to influence each other's charging either by means of paying partially or fully for the other subscriber or charging a premium dynamically and on a per call basis.

According to an implementation of the present subject matter, systems and methods for charging of a call in a communication network are described. In one implementation, in a call between a calling party and a called party, the called party may govern the manner in which the calling party is charged irrespective of the telecom operators of the calling party and the called party. In an example, dynamic flexibility can be provided by giving the called party discretion to govern charging of the calling party for the call. In an example, the called party may subscribe to a discretionary charging feature, by which the called party can govern a charging mechanism or scheme of the calling party during a call.

In one implementation, the discretionary charging feature is a service that contains information pertaining to charging rules or policies applicable to the calling party, as may be subscribed to by a user such as the called party. For example, a telecom operator can provide different call charging schemes to which a user can subscribe. These call charging schemes, in a dynamic manner, can be shared between network entities associated with the calling and the called parties, and can govern the manner in which the calling party is charged for a call. Therefore, the information stored in the discretionary charging feature can be referred to as dynamic charging information.

In one implementation, the dynamic charging information can be shared between the calling party and the called party during a call. For example, the subscription status and the details thereof may be forwarded by a network entity associated with the called party via a telecommunication network during a call flow, to a network entity associated with the calling party. Once the dynamic charging information relating to the discretionary charging feature has been shared with the network entity associated with the calling party, the calling party may be charged for the call according to the discretionary charging feature subscribed by the called party. The call flow proceeds through the duration of the call, until the call ends. During the call, the discretionary charging feature may be implemented to re-evaluate costs borne by the calling party and in some cases, the called party, for the duration of the call. In an example, the calling party may be charged according to an existing charging scheme of the calling party, and a re-evaluation of the charging may occur for a call with a called party, who has subscribed to the discretionary charging feature, once the dynamic charging information relating to the discretionary charging feature has been shared with the network entity associated with the calling party. Various implementations of the discretionary charging feature are provided below.

In one implementation, the calling party may be subscribed to a first telecom operator, and the called party may be subscribed to another telecom operator, for example, a second telecom operator. The called party, via a call charging system, may be provided with the option of governing the manner in which the calling party is charged for the call.

In one implementation, the call charging system facilitates making originating calls (OC) free of charge. In said implementation, the called party may be provided with a dynamic option to pay for an entire duration of the call on a per call basis. For example, the called party may be a customer helpline number, where all callers, i.e., calling parties, irrespective of their respective telecom operators, may call the customer helpline number free of charge. In an implementation, it can be facilitated for the called party to inform the calling party of the called party's subscription to the discretion charging feature, for example via a service control point (SCP) of the called party to a SCP of the calling party through mediating Service Switching points (SSPs). Subsequently the charging of the calling party and the called party can be influenced according to the discretionary charging feature.

In another implementation, the call charging system facilitates making OCs at a fixed charge. In said implementation, the called party may instruct the calling party to pay a fixed amount of money for the entirety of the call, independent of the duration of the call. For example, the calling party may be instructed to pay 'X' monetary units for the call, irrespective of the duration of the call. In this example, the telecom operators can facilitate an offline adjustment in order to settle accounts for calls between parties availing of this call charging feature.

In yet another implementation, the charging system facilitates charge sharing for a call between the calling party and the called party. In an example, the called party may subscribe to the discretionary charging feature where a ratio can be defined dynamically by which to split the charge for the call, such as a fifty-fifty ratio, whereby the called party can pay for half the total charges for the call and the calling party can pay the other half. It is to be appreciated that the charge can be shared in any ratio and is not limited to the example disclosed above. Also an operator may charge an additional premium on a per-call or fixed basis for subscription of such services.

In a further implementation, the charging system facilitates service based split charging between the calling party and the called party. For example, during a video call, the called party may instruct the calling party to bear the charges for the video service, and the called party could bear the charges for the call services. In said implementation, the service based split charging may be applicable over any call type having more than one bearer service.

In another implementation, the charging system facilitates limited period charging between the calling party and the called party. In said implementation, the called party, in an example, may instruct the calling party to bear the charges of the call only for a limited duration, and the called party would bear the charges for the remaining duration of the call. In one example, the called party may specify for the calling party to pay for an initial period of say, 5 minutes, and the called party could pay for the remaining duration of the call. In another example, the called party may specify the calling party to bear the charges for the call subsequent to the expiry of say, 1 minute from the start of the call. This means, the called party would bear the charges for the first minute, and the calling party would bear the charges for the remaining period of time that the call subsists.

The above implementations have been cited as examples of the various embodiments of the present subject matter for the purpose of explanation. It is to be noted that the above mentioned implementations are not to be construed in a limiting manner, and it should be noted that the present subject matter introduces a dynamic sharing of charging parameters between the calling and the called party irrespective of their telecom operators. The person skilled in the art would appreciate that the scope of the present subject matter can extend to other features other than the examples cited above, which in turn can facilitate telecom operators to provide a variety of charging options for their customers.

According to the present subject matter, the charging system may be implemented with substantially minor software enhancements at service switching points (SSP), local exchanges, and SCPs. Therefore, no additional hardware implementation may be required, which further reduces capital costs and efforts. Moreover, the present subject matter can be implemented for subscribers irrespective of their telecom operators, i.e., the invention is operator agnostic. In such a manner, it can be facilitated to incorporate special charging tariffs across communication networks, irrespective of the telecom operators. For example, global toll free numbers may be provided to customers, where irrespective of the telecom operator, the customer may be able to call a number at special rates.

It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection or an indirect connection.

Figure 1:
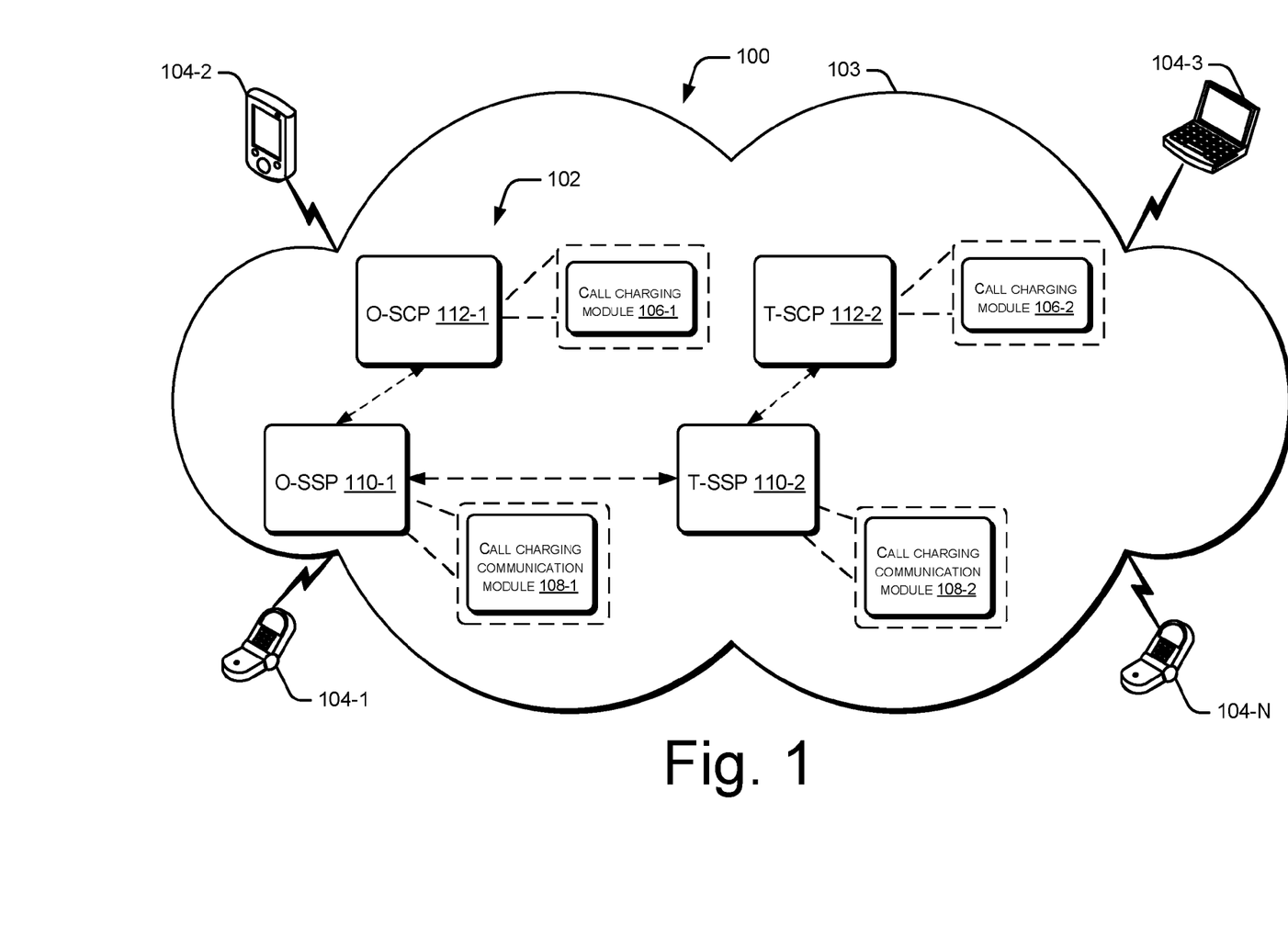
FIG. 1 illustrates a communication network environment for determining call charges, according to an implementation of the present subject matter.

FIG. 1 illustrates a communication network environment 100 implementing a call charging system 102 that can be configured to determine charges for a call, according to an implementation of the present subject matter. The communication network environment 100 includes one or more communication devices 104-1, 104-2, 104-3, . . . and 104-N, collectively referred to as communication devices 104, communicating with each other through a communication network 103. The communication devices 104 may include, without limitation, desktop computers, hand-held devices, laptops or other portable computers, network computers, mobile phones, landline phones, and the like. Each of the communication devices 104 works on a communication protocol as defined by the communication network 103 to which the communication devices 104 are coupled.

The communication network 103 may be a wireless or a wired network, or a combination thereof. The communication network 103 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 103 includes various network entities, such as gateways and routers; however, such details have been omitted for ease of understanding. For example, in a GSM specific network, Customized Applications for Mobile Enhanced Logic CAMEL support can be provided and in case of a CDMA specific network, a Wireless Intelligent Network (WIN) support can be provided.

The foregoing description is explained with reference to the communication devices 104-1 and 104-2, and it will be understood that the same can be extended to other communication devices 104 as well. Further, a user of the communication device 104-1 may be referred to as a first user 104-1 and a user of the communication device 104-2 may be referred to as a second user 104-2. Furthermore, the first user 104-1 and the second user 104-2 may collectively be referred to as the users 104. The first user 104-1 may communicate with the second user 104-2 over a voice call. The first user 104-1 can be subscribed to a first telecom operator, and the second user 104-2 can be subscribed to either the first telecom operator or another telecom operator, such as a second telecom operator.

In one implementation, a calling party, for example the first user 104-1, makes a call to a called party, such as the second user 104-2. In said implementation, during the call, an originating service switching point (O-SSP) 110-1, to which the first user 104-1 can be latched onto, may be configured to communicate with a terminating service switching point (T-SSP) 110-2, to which the second user 104-2 can be latched onto. Generally, the Service Switching Points (SSPs) are routing entities that facilitate routing of calls between two or more subscribers. The SSPs may query the respective Service Control Points (SCPs) to verify subscription of a user and compute charges for the telecom services used by the user. The respective SCPs at originating and terminating call segments control the call flow by directing the SSPs to take respective actions. The SSPs have defined trigger points at which respective SCPs may be queried for further instructions during a call. The SSP implements Basic Call State Machine (BCSM) which is a finite state machine that represents an abstract view of a call from beginning to end (off hook, dialing, answer, no answer, busy, hang up, etc.). As each state is traversed, the exchange encounters Detection Points (DPs) at which the SSP may invoke a query to the SCP to wait for further instructions on how to proceed. Triggering criterion is defined by the telecom operator and might include the subscriber calling number or the dialed number.

In an example, consider that the second user 104-2 has subscribed to a discretionary charging feature as provided by the call charging system 102. Information pertaining to the discretionary charging feature as subscribed to by the second user 104-2 may be stored in the corresponding SCP, such as the T-SCP 112-2. Similarly, if the first user 104-1 is also subscribed to the discretionary charging feature, the data pertaining to said discretionary charging feature can be stored in the O-SCP 112-1. The discretionary charging feature can be provided in various combinations, which are explained in later stages of the draft.

In one implementation, the O-SCP 112-1 and the T-SCP 112-2, amongst other things, may include call charging modules 106-1 and 106-2, respectively. The call charging module 106-2 of the T-SCP 112-2 can be configured to forward data pertaining to the discretionary charging feature to the T-SSP 110-2. Furthermore, the O-SSP 110-1 and the T-SSP 110-2, amongst other things, can include call charging communication modules 108-1 and 108-2, respectively. During operation, the call charging communication modules 108-1 and 108-2 can be configured to receive data from their respective SCPs, particularly the call charging modules 106-1 and 106-2.

During operation, while making a call, by the first user 104-1 at the originating call segment, the O-SSP 110-1 can be configured to query the O-SCP 112-1 to check if the first user 104-1 has sufficient rights to make the call. The rights that may be in the form of subscription rights, can include, but is not limited to, account balance and location of the first user 104-1. In response to this query, the O-SCP 112-1 can be configured to respond with a granted time slice, which is indicative of a time for which the call can proceed before the O-SSP 110-1 queries the O-SCP 112-1 once more for sufficient rights. Furthermore, at the terminating call segment, the T-SSP 110-2 can be configured to routinely query the T-SCP 112-2 when receiving the call to check if the second user 104-2 has sufficient rights to answer the incoming call. In one implementation, the T-SCP 112-2 can be configured to store the subscription details, such as account balance and discretionary charging feature details.

Upon obtaining the rights of the second user 104-2 from the T-SCP 112-2, the T-SSP 110-2 can be configured to route the call to the second user 104-2. The T-SSP 110-2 can be configured to share the dynamic charging information relating to the discretionary charging feature with the O-SSP 110-1. Furthermore, in one example, during the call, upon expiry of the initially allotted time slice, the O-SSP 110-1 can be configured to further query the O-SCP 112-1 for further call rights to continue the call. In this query, the dynamic charging information related to the discretionary charging feature can be shared with the O-SCP 112-1. In another example, the call may be terminated by either the first user 104-1 or the second user 104-2. Furthermore, during the call, before the discretionary charging feature is communicated to the O-SCP 112-1, the O-SCP 112-1 may charge the first user 104-1 according to a regular charging policy that the first user 104-1 is subscribed to. However, once the dynamic charging information has been shared with the O-SCP 112-1, such as on the expiry of the first time slice allotted by the O-SCP 112-1, the O-SCP 112-1 can be configured to charge the first user 104-1, according to the discretionary charging feature. In another example, the O-SCP 112-1 can also be configured to credit or debit any charges initially blocked or debited for the initial time slice, for the first user 104-1. Upon sharing of the dynamic charging information, the discretionary charging feature may be utilized to adjust or re-evaluate the charges to be applied for both the first user 104-1 and the second user 104-2, depending on the particular details of the discretionary charging feature and the duration of the call. In other words, after the discretionary charging information has been shared between the T-SCP 112-2 and the O-SCP 112-1, the two SCPs can be configured to independently revise their rating/charging rules in accordance to the subscribed discretionary charging feature for the rest of the call.

Figure 2A:
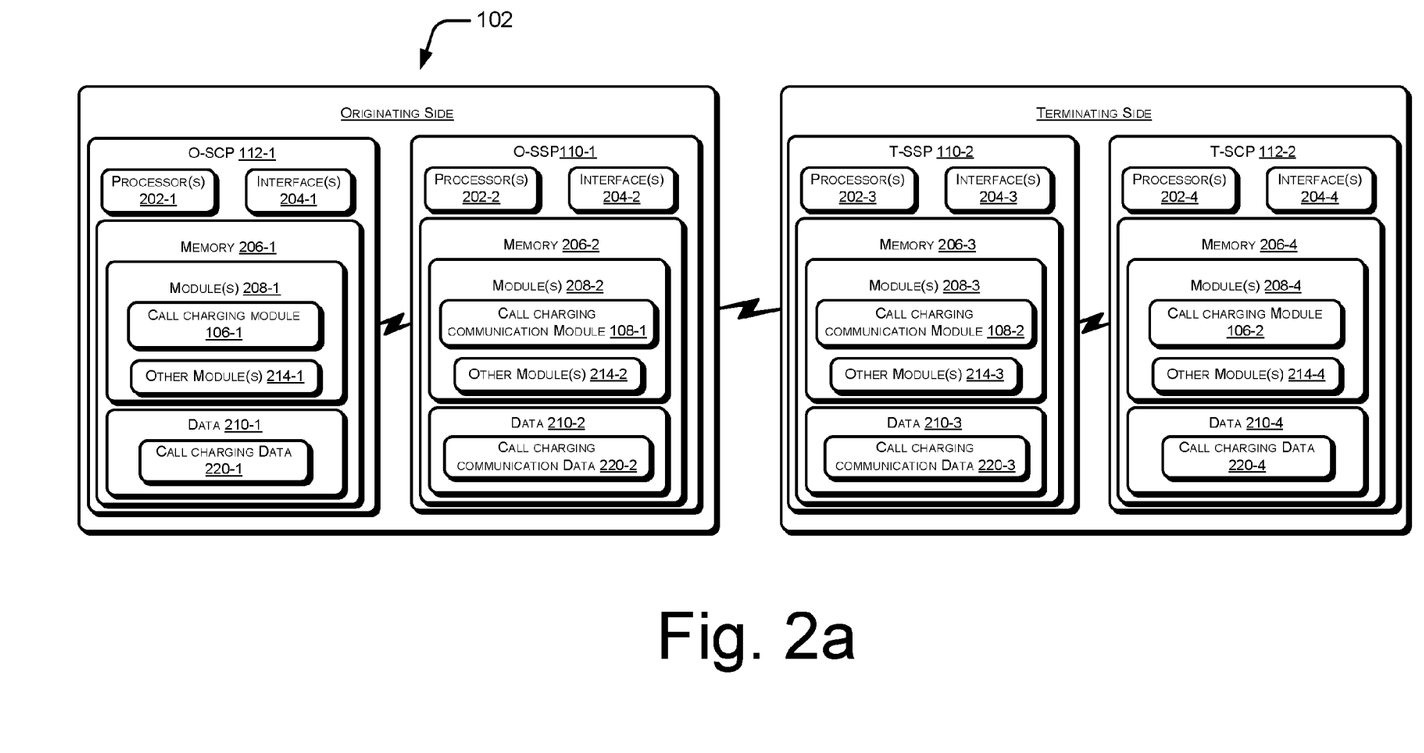
FIG. 2a illustrates a call charging system, according to an implementation of the present subject matter.

FIG. 2a illustrates the call charging system 102 according to an implementation of the present subject matter. The figure shows a call originating side and a call terminating side. The O-SSP 110-1 and the O-SCP 112-1 are located on the originating side, and the T-SSP 110-2 and the T-SCP 112-2 are located on the terminating side. FIG. 2c illustrates a call flow diagram indicating determination of charges for a call in a GSM network, according to an implementation of the present subject matter. For example, the call flow may be applied with respect to the call charging system 102 as shown in FIG. 2a. The various arrow indicators used in the call-flow diagram depict the transfer of data corresponding to various entities, such as the O-SSP 110-1, the O-SCP 112-1, the T-SSP 110-2 and the T-SCP 112-2. Although the description of FIG. 2(a) has been made in considerable detail with respect to a GSM network, it will be understood the charges for the calls may determined for other networks as well, for example, CDMA network.

In one implementation, to enable the first user 104-1 and the second user 104-2 for making or receiving a call, the communication network environment in this implementation, may implement the CAMEL protocol. The call flow diagram has been explained in considerable details with respect to the first user 104-1 being the caller party and the second user 104-2 being the called party. Various types of calls are possible, for example, the type of call may also be a video call, which includes one or more bearer services, in this case, a video and an audio bearer service. Furthermore, either the first user 104-1 or the second user 104-2, or both the first user 104-1 and the second user 104-2 may be outside their home calling region, i.e., roaming.

In one implementation, the O-SCP 112-1 includes one or more processor(s) 202-1, interface(s) 204-1, and a memory 206-1 coupled to the processor 202-1. The O-SSP 110-1 includes one or more processor(s) 202-2, interface(s) 204-2, and a memory 206-2 coupled to the processor 202-2. The T-SSP 110-2 includes one or more processor(s) 202-3, interface(s) 204-3, and a memory 206-3 coupled to the processor 202-3. The T-SCP 112-2 includes one or more processor(s) 202-4, interface(s) 204-4, and a memory 206-4 coupled to the processor 202-4.

The processors 202-1 . . . 202-4 can be a single processing unit or a number of units, all of which could also include multiple computing units. The processors 202-1 . . . 204-4 may be implemented as one or more microprocessors, microcomputers, microcontrollers, digital signal processors, central processing units, state machines, logic circuitries, and/or any devices that manipulate signals based on operational instructions. Among other capabilities, the processors 202-1 . . . 202-4 are configured to fetch and execute computer-readable instructions and data stored in the memory 206-1 . . . 206-4.

The interfaces 204-1 . . . 204-4 may include a variety of software and hardware interfaces, for example, interface for peripheral device(s), such as a keyboard, a mouse, an external memory, and a printer. Further, the interfaces 204-1 . . . 204-4 may enable the call charging system 102 to communicate with other computing devices, such as web servers and external databases in the communication network (not shown in the figure). The interfaces 204-1 . . . 204-4 may facilitate multiple communications within a wide variety of protocols and networks, such as a network, including wired networks, e.g., LAN, cable, etc., and wireless networks, e.g., WLAN, cellular, satellite, etc. The interfaces 204-1 . . . 204-4 may include one or more ports for connecting the call charging system 102 to a number of computing devices.

The memory 206-1 . . . 206-4 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 206-1 . . . 206-4 also include module(s) 208-1 . . . 208-4 respectively, and data 210-1 . . . 210-4 respectively.

The module(s) 208-1 . . . 208-4 include routines, programs, objects, components, data structures, etc., which perform particular tasks or implement particular abstract data types. In one implementation, the module 208-1 of the O-SCP 112-1 and the module 208-4 of the T-SCP 112-2, include the call charging module 106-1 and the call charging module 106-2, respectively. Similarly, the module 208-2 of the O-SSP 110-1 and the module 208-3 of the T-SSP 110-2, include the call charging communication module 108-1 and the call charging communication module 108-2, respectively. Further, the modules 208-1 . . . 208-4 also include other module(s) 214-1 . . . 214-4 respectively. The other module(s) 214-1 . . . 214-4 may include programs or coded instructions that supplement applications and functions of the respective SSPs and SCPs.

Furthermore, the data 210-1 . . . 210-4, inter alia serves as a repository for storing data processed, received, and generated by one or more of the module(s) 208-1 . . . 208-4. In one implementation, the data 210-1 and 201-4 includes, call charging data 220-1 and 220-4, respectively. The data 210-2 and 210-3 includes, for example, call charging communication data 220-2 and 220-3, respectively. The data 210-1 . . . 210-4 can also include other data (not shown) that in one example can include data generated as a result of the execution of one or more modules in the module(s) 208. In one implementation, the call charging system 102 operates on a GSM network supported by CAMEL protocol.

In one example, a user, such as the first user 104-1 makes a call to another user, say the second user 104-2. In said example, the second user 104-2 can be subscribed to the call charging system 102. In one implementation, the discretionary charging feature can be implemented in the call charging module 106-2. Furthermore, in such case, initially during the call, on an originating side, the call charging communication module 108-1 can be configured to query the charging feature module 106-1 with for example, an Initial Detection Point (IDP) 203, such as a CAMEL protocol based IDP Operation. In response, the call charging module 106-1 can be configured to respond with a CONTINUE Operation, Apply Charging (AC) operation 205 along with a granted time duration, which is indicative of a time for which the call can proceed before the call charging communication module 108-1 queries the call charging module 106-1 once again in order to proceed with the call. For example, the granted time duration may be provided in a "MaxCallDuration" parameter of the AC operation from the O-SCP 112-1 to the O-SSP 110-1.

In one example, the subscription details, such as an account balance, tariff plans or charging rules, and subscription rights to discretionary charging feature can be stored in the call charging data 220-1 and 220-4.

Moreover, during operation, on receiving the AC operation 205, the O-SSP 110-1 can be triggered to forward an Initial Address Message (IAM) 207, which is indicative of the incoming call to the T-SSP 110-2. On a terminating side, the T-SSP 110-2, on receiving the IAM 207, can be configured to query the T-SCP 112-2 with an IDP 209. Generally, an SCP for the second user, in this case the T-SCP 112-2, can be determined by the SSP via a Home Location Register (HLR). The IDP 209 obtains information whether the second user 104-2 has sufficient rights to answer the call or not. In said example, the call charging communication module 108-2 can be configured to perform a check by querying the call charging module 106-2 to obtain the required information. Here it can be ascertained if the second user 104-2 has subscribed to the discretionary charging feature. The T-SCP 112-2 performs all the required checks, such as acquiring an account balance in response to the received IDP 209, and responds with an Apply Charging (AC) RRBCSM and a CONTINUE operation 211 to the T-SSP 110-2. In one implementation, this AC, RRBCSM and CONTINUE operation 211 contains a parameter "party to charge" containing data specific to the discretionary charging feature as subscribed to by the second user 104-2.

Figure 2B:
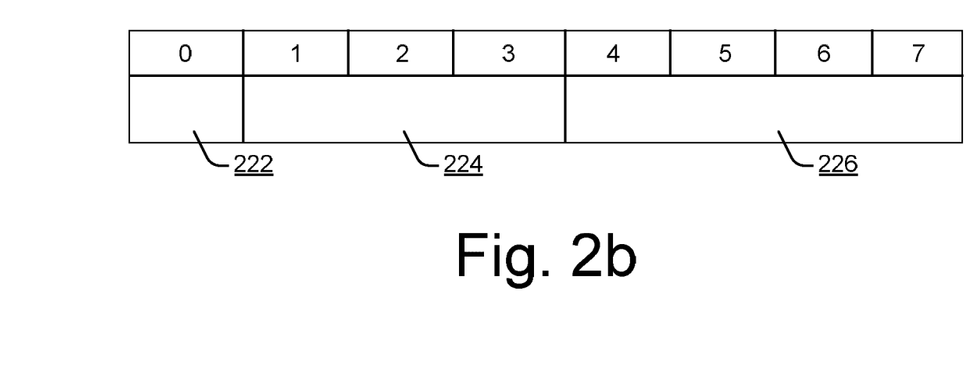
FIG. 2b illustrates a party to charge parameter, according to an implementation of the present subject matter.
Figure 2C:
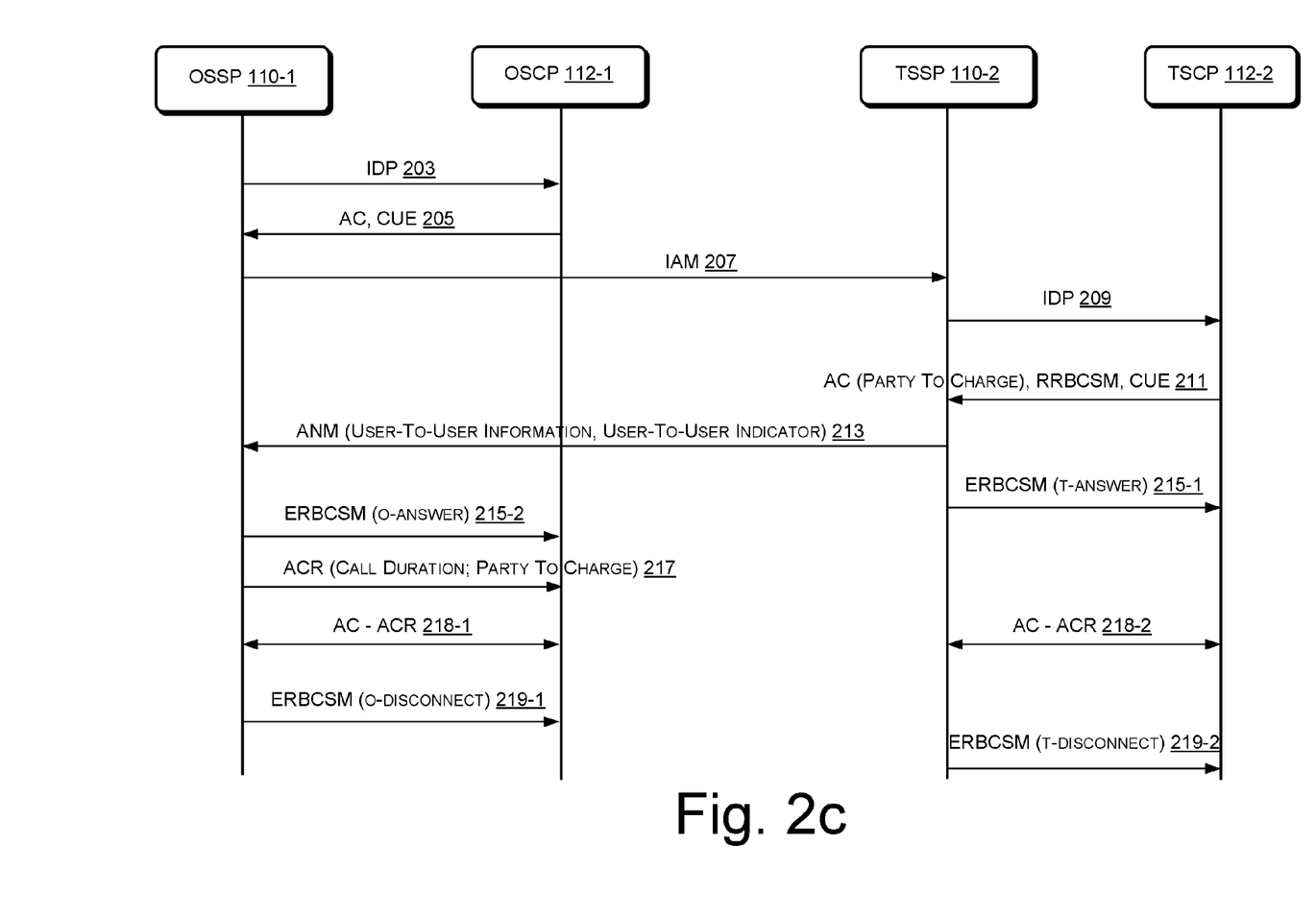
FIG. 2c illustrates a call flow diagram in a Global System for Mobile (GSM) network environment, in accordance with an embodiment of the present subject matter.

FIG. 2b shows an example of the party to charge parameter, according to an implementation of the present subject matter. The party to charge parameter can be an octet string, where 8 bit values can be configured to indicate pre-defined values. For example, bit 0 can be a request identifier 222 where a value=0 identifies a normal AC invocation, and a value=1 identifies a 'discretionary charging' invocation. Furthermore, bits 1 to 3 can be a discretionary charging feature indicator 224 used to indicate which kind of discretionary charging feature has been subscribed to by the user. For example, in a binary system, bits 1, 2 and 3 can be assigned to values 0 to 7, where the values 0 to 4 can be a 'free charging for calling party', 'fixed charge call', 'service based split charging', 'charge sharing' and 'limited period charging'. Values 5 to 7 can be for spare or future use. Moreover, each of the discretionary charging features will be explained with respect to the call flow at a later stage in the draft. Further, the bits 4 to 7 in the octet string may be used to indicate discretionary charging feature parameters 226. For example, for a 'fixed charge call' discretionary charging feature, the value of the charge may be defined in this party to charge parameter.

Furthermore, during operation, on receiving the AC, RRBCSM and CONTINUE operation 211, the second user 104-2 can be notified of an incoming call, for example by his communication device.

In one implementation, when the second user 104-2 answers the call, the T-SSP 110-2 can be configured to simultaneously inform the O-SSP 110-1 of the same via an Answer Message (ANM) 213, which contains a trigger to indicate to the O-SSP 110-1 that the first user 104-1 may now start being charged for the call. In an example, the ANM 213 can be an ISDN User Part (ISUP) protocol based ANM. Furthermore, in one implementation, the ANM 213 also contains two parameters, 'user-to-user information' and 'user-to-user indicator'.

The 'user-to-user information' and the 'user-to-user indicator' contain information pertaining to the details of the discretionary charging feature as subscribed to by the second user 104-2. These two parameters can be derived from the 'party to charge' parameter as disclosed earlier. The information received in the 'party to charge' parameter of the AC, RRBCSM and CONTINUE operation 211 can be passed on transparently to the O-SSP 110-1 in the 'user-to-user information' of the ANM 213. In one example, the 'user-to-user information' and the 'user-to-user indicator' can be an octet string with configurable bits. The information from the party to charge parameter can be directly copied onto the user-to-user information. In this manner, the data pertaining to the discretionary charging feature may be communicated to the originating side, particularly the O-SSP 110-1. Thus, the O-SSP 110-1 may check the user-to-user information field in the ANM 213 to identify if it contains the discretionary charging feature. In an example, the user-to-user indicator is configured to a value 11111110 to indicate the implementation of the discretionary charging feature.

In one implementation, upon communication of the ANM 213, the O-SSP 110-1 and the T-SSP 110-2 can be individually configured to forward an ERBCSM respectively to their respective SCPs. For example, the T-SSP 110-2, upon the second user 104-2 answering the call, forwards an ERBCSM 215-1 to the T-SCP 112-2. Similarly, the O-SSP 110-1 can forward an ERBCSM 215-2 to the O-SCP 112-1. Therefore, the ERBCSM indicates that the call has been answered.

At this point of time in operation, both the first user 104-1 and the second user 104-2 are connected to each other and in the call. Therefore, both the O-SCP 112-1 and the T-SCP 112-2 can now independently initiate charging the respective users 104-1 and 104-2 for the duration of the call, according to the default stored logic. In one example, the second user 104-2 can be charged according to the discretionary charged feature which is the default charging logic stored in the T-SCP 112-2, and the first user 104-1 can be charged according to the default charging scheme as is stored in the O-SCP 112-1. Here, the O-SCP 112-1 can be configured to reserve an amount based on the initial time slice allotted to the first user 104-1 in the AC operation 205.

During the call, in one implementation, as the time slice that was initially granted via the AC operation 205 nears expiry, the O-SSP 110-1 can be configured to respond to the O-SCP 112-1, for example, with an Apply Charging Report operation 217. In one example, the ACR operation 217 contains parameters indicative of actual call duration usage from the granted call time, as well as the discretionary charging feature details, as described earlier. Furthermore, the ACR operation 217 indicates to the O-SCP 112-1 that the duration that was blocked during the AC operation 205, is now completed. Therefore, during the call, once the dynamic charging information has been shared with the O-SCP 112-1 via the first ACR operation 217, the O-SCP 112-1 can be configured to charge the first user 104-1 according to the discretionary charging feature. The O-SCP 112-1 can also be configured to re-evaluate the charges initially blocked or debited based on the AC operation 205, for the first user 104-1.

In the event that the call extends beyond the first time slice, i.e., beyond the ACR operation 217, the O-SSP 110-1 and the O-SCP 112-1, and the T-SSP 110-2 and the T-SCP 112-2 are configured to exchange more than one AC-ACR operation 218-1, 218-2 during the call. For example, for every expiry of a time slice, the AC-ACR operation 218-1, 218-2 occurs in order to update the maximum possible call duration, and to procure a further time slice as per the requirement. The new charging mechanism specified in the dynamic charging information via the first ACR operation 217 can now be applied for the remaining duration of the call. Moreover, via the AC-ACR operations 218-1, 218-2, the call charging communication modules 108-1 and 108-2 of the O-SSP 110-1 and the T-SSP 110-2 respectively, can be configured to update their respective SCPs with the progressing call duration. In this manner, the charge for the call, in accordance with the discretionary charging mechanism, for both the first user 104-1 and the second user 104-2 can be applied. In order to compute a total charge for the entire duration of the call, the respective call charging modules 106-1 and 106-2 can be configured to compute the charges for each of the time slices to obtain the total call charge. Moreover, upon termination of the call by either the first user 104-1 or the second user 104-2, the call charging communication module 108-1 of the O-SSP 110-1 and the call charging communication module 108-2 of the T-SSP 110-2 can be configured to forward ACR and ERBCSM operations 219-1 and 219-2. The ERBCSM operations 219-1 and 219-2 are indicative to their SCPs that the call has been released or disconnected and that the SCPs can stop charging the call.

The various examples of the discretionary charging features are possible. The embodiments provided below are for sake of explanation. They should not be construed in a limiting manner.

In one implementation, the discretionary charging feature allows for a free calling of the calling party. In other words, the calling party, such as the first user 104-1, may not be charged for the entire duration of the call. In an example, a global toll free number can be realized with this implementation of the present subject matter. In this example, a toll free number may be provided, where the toll free number is subscribed to this discretionary charging feature. Therefore, all calling parties, irrespective of their telecom operators, may call the toll free number free of cost. This is beneficial in that a single number can be provided for any telecom operator subscriber, in order to facilitate free calling for the calling parties irrespective of their telecom operators.

In this implementation, the second user 104-2 has to be charged for the call instead of the first user 104-1. In one example, if the first user 104-1 is roaming, the second user 104-2 would not be charged for said roaming charges.

During the call, the call flow proceeds as illustrated in FIG. 2c. During operation, in response to the IDP 209, the T-SCP 112-2 can be configured as disclosed earlier, to respond with the AC operation 211, which includes the 'party to charge' parameter. In this implementation, the 'party to charge' parameter includes details pertaining to the discretionary charging feature, particularly for the free charging of the calling party.

In this case, as disclosed earlier, the octet string may be configured by providing the following values for the corresponding bits:
  bit 0=1, where this indicates that the discretionary charging feature is enabled;
  bit 1, 2, 3=0, where this indicates that the 'free charging for calling party' feature is enabled;
  bit 4, 5, 6, 7=0, where this indicates that the calling party is not to be charged for the call, and a normal AC and ACR operation exists between the SSP and the SCP.

During the call flow, the user-to-user information and a user-to-user indicator are forwarded, in the ANM operation 213, from the T-SSP 110-2 to the O-SSP 110-1. As described earlier, the user-to-user information contains the party to charge parameter and the user-to-user indicator is utilized to indicate the implementation of the discretionary charging feature. In an example, the user-to-user indicator is configured to a value 11111110 to indicate the implementation of the discretionary charging feature. Furthermore, when the transmission of the ACR operation 217 from the O-SSP 110-1 to the O-SCP 112-1, for example according to the CAMEL protocol, has completed, the O-SCP 112-1 can be configured to scan the 'party to charge' parameter, and re-evaluate the charges applicable to the first user 104-1 according to the details specified in the 'party to charge' parameter. In this case, the charges applied to the calling party for the call may be entirely refunded.

In another implementation, a fixed charge call is facilitated, where the calling party, such as the first user 104-1, can be instructed by the called party, such as the second user 104-2 to pay a fixed amount for the entire call. For example, for a call of any duration, the first user 104-1 will be charged 'X' monetary currency. In this case, if the value of the call charge is less than the actual duration of the call, the first user 104-1 will pay only a fixed charge, and the second user 104-2 may be charged the remainder of the charges on his charging, which in one example, can be specified by the telecom operator of the second user 104-2.

Similar to the earlier implementation, the second user 104-2 may or may not be charged roaming charges for the first user 104-1 in case the first user 104-1 is roaming. Therefore, based on the charging policies specified for roaming by the telecom operator, the first user 104-1 according to this implementation, can be instructed to pay a certain fixed charge for the duration of the call and any additional roaming charges if found.

In this case, as disclosed earlier, the octet string of the 'party to charge' parameter may be configured by providing the following values for the corresponding bits:
bit 0=1, where this indicates that the discretionary charging feature is enabled;
bit 1, 2, 3=1, where this indicates that the 'fixed charge call' feature is enabled;
bit 4, 5, 6, 7=FIXED CHARGE VALUE, where this indicates the value of the fixed charge that the calling party is to be charged for the call.

The fixed charge value may be pre-defined by the telecom operator and applicable to all subscribers or may be governed by the nature of Discretionary Charging subscription. Furthermore, upon the transmission of the ACR operation 217 as described earlier, the O-SCP 112-1 can be configured to scan the party to charge parameter and obtain the fixed value as per the last four bits of the party to charge parameter and re-evaluate the charges applicable to the first user 104-1. Depending on the re-evaluation, the O-SCP 112-1 can be configured to either debit or credit the first user 104-1.

In a further implementation, a service based split charging may be facilitated, in which case, a call may involve two simultaneous bearer services, such as a video call. In a video call, the call includes a voice service as well as a video service. According to this implementation of the present subject matter, one of the users can be charged for one of the bearer services and the other user can be charged for the other bearer service.

In this implementation, the party to charge parameter can be configured to indicate, which of the bearer services the first user 104-1 is to be charged. The octet string of the 'party to charge' parameter may be configured by providing the following values for the corresponding bits:
bit 0=1, where this indicates that the discretionary charging feature is enabled;
bit 1, 2, 3=2, where this indicates that the 'service based split charging' feature is enabled;
bit 4, 5, 6, 7=TELESERVICE BEARER CODE, where the service code indicates for which of the bearer services the calling party is to be charged. The service code may be pre-defined by the telecom operator and applicable to all subscribers.

In one example, the O-SCP 112-1 can be configured to re-evaluate the call charges for the first user 104-1, and adjust the charges accordingly. Upon receiving the party to charge parameter via the ACR operation 217, the O-SCP 112-1 can be configured to scan the 'party to charge' parameter, and re-evaluate the charges applicable to the first user 104-1 according to the details specified therein. In an example, the O-SCP 112-1 can be configured to charge the first user 104-1 according to the teleservice bearer code defined in the last 4 bits of the party to charge parameter. For a video call initiated by the first user 104-1, if the teleservice bearer code received in the party to charge parameter specifies a video bearer service, then the first user 104-1 shall be charged for the video bearer service only. The second user 104-2 however, can be charged for the audio bearer service in addition to any other call subscription charges as defined by the charging rules at the T-SCP 112-2.

In another implementation, the discretionary charging feature includes a sharing of charge between the first user 104-1 and the second user 104-2. For example, in a call, a ratio can be defined dynamically by which to split the charge for the call, such as, a fifty-fifty ratio whereby the first user 104-1 can pay for half the total charges for the call and the second user 104-2 can pay the other half. In other words, the T-SCP 112-2 can derive a fractional discount to be applied to calling charges and accordingly use the remaining fractional value for its own charging.

In this case, as disclosed earlier, the octet string of the 'party to charge' parameter may be configured by providing the following values for the corresponding bits:
bit 0=1, where this indicates that the discretionary charging feature is enabled;
bit 1, 2, 3=3, where this indicates that the 'charge sharing' feature is enabled;
bit 4, 5, 6, 7=FRACTIONAL SPECIFICATION VALUE, where this indicates the fractional charging of the calling party. For example, these discretionary charging feature parameters 226 can include fractional specification values as follows:

TABLE 1

| Fractional Specification Value | Implication |
|---|---|
| 1 | Charge completely |
| 2 | Apply ½ the total charge to the calling |
| 3 | Apply ⅓ the total charge to the calling |
| 4 | Apply ¼ the charge to the calling |
| 5 | Apply ⅕ the charge to the calling |

The values provided in table 1 are examples of values which can be assigned to the fractional specification value. It is to be appreciated that the fractions are not limited to the examples provided in table 1. The fractional specification values may be pre-defined by the telecom operator and applicable to all subscribers or may be governed by the nature of Discretionary Charging subscription. The O-SCP 112-1 can be configured to scan the party to charge parameter upon receiving the ACR operation 217, to obtain the fractional specification value as defined by the last 4 bits of the party to charge parameter. Based on the fractional specification value, the O-SCP 112-1 can be configured to re-evaluate the charges reserved in the first AC operation 205 and refund the required amount to the first user 104-1. Thereafter for subsequent time slices, according to the AC-ACR operation 218-1, the updated charging according to the discretionary charging feature can be applied.

In yet another implementation, a limited period charging is invoked by the discretionary charging feature. In said implementation, the second user 104-2 may instruct the first user 104-1 to bear the charges for a specified duration, after which, the second user 104-2 would bear the charges. For example, the first user 104-1 could bear the charges for the first minute of the call, and the second user 104-2 would bear the charges for the remaining duration of the call. In another example, the second user 104-2 can be specified an initial duration for which the call would be free of charge for the first user 104-1, after which, the first user 104-1 can be charged.

In this case, as disclosed earlier, the octet string of the 'party to charge' parameter may be configured by providing the following values for the corresponding bits:

bit 0=1, where this indicates that the discretionary charging feature is enabled;
bit 1, 2, 3=4, where this indicates that the 'fixed charge call' feature is enabled;
bit 4, 5, 6, 7=CALLING CHARGE TIME DURATION, where this defines a time duration for which the calling party has to be charged or not be charged.

In one example, the initial 5 minutes duration for the call is not to be charged for the first user 104-1. Upon receiving the ACR operation 217, the O-SCP 112-1 can be configured to scan the party to charge parameter to obtain charging details therefrom. In this case, depending on actual call duration and time slice duration, the amount reserved in the first time slice can be re-evaluated and adjusted, and the balance can be adjusted in subsequent time slice reservations. In the case where the actual call duration is greater than 5 minutes, the O-SCP 112-1 can be configured to charge the first user 104-1 only for the call duration above the first 5 minutes, and refund the charges reserved for the first 5 minutes to the first user 104-1.

In another example, the first 5 minutes duration of the call can be chargeable for the first user 104-1. Similar to the manner prescribed above, the O-SCP 112-1 can be configured to scan the party to charge parameter and refund the first user 104-1 only for the duration of the call above 5 minutes. Therefore, in case the actual call duration is below 5 minutes, the actual call duration will be used to charge the first user 104-1.

In one example, according to the various implementations disclosed above, the data, such as the 'party to charge' parameters, the octet string and the corresponding codes can be stored in the call charging data 220-4.

Furthermore, an activation or deactivation of the discretionary charging feature can be facilitated for a user, for example, via an Unstructured Supplementary Service Data (USSD) operation or an Interactive Voice Response (IVR) operation. Telecom operators can specify an operation with which the user can activate and deactivate the discretionary charging feature. For example, the USSD based mechanism for activation and deactivation requires the end-user to dial in a specific USSD string, where codes may be provided corresponding to the different types of discretionary charging features as earlier described. An example of discretionary charging feature codes and USSD strings are provided in table 2 below:

TABLE 2

| Feature | Activation Code | Deactivation Code |
|---|---|---|
| Free charging for calling party | 991 | 981 |
| Fixed charge call | 992 | 982 |
| Service based split charging | 993 | 983 |
| Charge sharing | 994 | 984 |
| Limited period charging | 995 | 985 |

To activate or deactivate one of the features specified in table 2 for a specific calling party, the following string can be used:

\*<Activation/Deactivation Code>\*<Calling party number to register>#

To activate or deactivate one of the features specified in table 2 for all calling parties, the following string can be used:

\*<Activation/Deactivation Code>\*0#

In one example, telecom operators can provide feature charge plans, charge sharing plans and limited charging plans. These plans can specify the operator plan applicable the respective discretionary charging features, to which users can subscribe.

In another example, the user can define a subscription list, where the list specifies registered calling parties by the subscriber for each discretionary charging feature that is subscribed to. Table 3 below is an example of a subscription list, such as for the fixed charge discretionary charging feature:

TABLE 3

| Fixed charge subscription list table | |
|---|---|
| MSISDN Ref (called subscriber) | Registered calling party numbers |
| 9811001100 | 9811092233 |
| 9811001100 | 9991180803 |

Similarly, subscription lists for the other discretionary charging features such as the free calling for charging party, service based split charging, charge sharing and limited period charging may be provided.

In a further example, the telecom operator can provide feature plan tables, which can define the mapping between the applicable operator plan for the discretionary charging feature and the respective charge parameters. For example, the limited charge period features rate plan can allow a called subscriber to make the calling party pay for only 10 seconds of the initial call period. In another example, the fixed charge feature rate plan can allow the called subscriber to pay 10 currencies for the entire duration of the call. The following tables (table 4a, 4b and 4c) are examples of the feature plan tables for different implementations of the discretionary charging feature as described earlier.

TABLE 4a

| Fixed charge feature plan table | |
|---|---|
| Fixed charge plan | Fixed charges for calling party |
| 1 | 10 |
| 2 | 12 |

TABLE 4b

Charge sharing feature plan table

| Charge sharing plan | Applicable fractional charge |
|---|---|
| 1 | ½ |
| 2 | ¼ |

TABLE 4c

Limited period charge plan table

| Limited period charge plan | charge duration for calling party in seconds |
|---|---|
| 1 | 30 |
| 2 | 40 |

Table 5 below illustrates an example of a feature subscription table in order to explain the present subject matter.

TABLE 5

Feature Subscription Table

| MSISDN (called subscriber) | Discretionary charging feature subscription BITMAP (CHAR) | Fixed charge plan (NUMBER) | Charge sharing plan (NUMBER) | Limited period charging (NUMBER) |
|---|---|---|---|---|
| 9811001100 | 11000000 | 2 | 0 | 0 |

Table 5 illustrates a feature subscription table, which in one example can be stored in an SCP, such as the O-SCP 112-1. In this table, the mobile number ISDN identifies a subscriber who has activated said feature. Moreover, in this case, the called subscriber has subscribed to the fixed charge plan no. 2, which allows him to charge the calling party at a fixed rate of currency 12 (shown in table 4a). The BITMAP configuration of the party to charge parameter can be attached to the party to charge parameter configuration, which in this case corresponds to the fixed charge plan. Furthermore, since this user, identified with the MSISDN 9811001100 has defined a calling party subscription list, therefore only when the users from this list make a call the fixed charging feature apply.

Table 6 below provides a BITMAP description according to an implementation of the present subject matter.

TABLE 6

BITMAP DESCRIPTION BIT POSITION

| 1 | 2 | 3 | 4 | 5 | 6 | 7 | 8 |
|---|---|---|---|---|---|---|---|
| Free Charging for Calling Party | Fixed Charge Call | Service based Split Charging | Charge Sharing | Limited Period Charging | SPARE | | |

The above implementations are not exhaustive in nature, and are not to be construed in a limiting fashion. The person skilled in the art would appreciate that various other implementations of the discretionary charging feature are possible.

Figure 3:
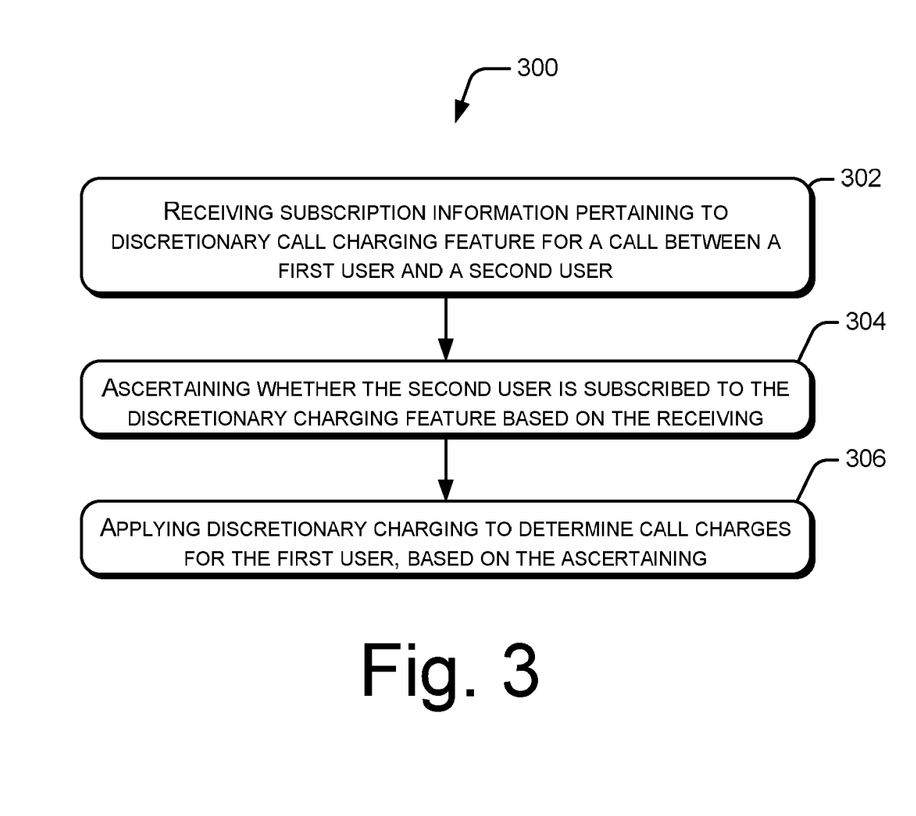
FIG. 3 illustrates a method for call charging according to an implementation of the present subject matter.

FIG. 3 illustrates a method 300 for charging of calls, according to one embodiment of the present subject matter.

The method 300 may be implemented in a variety of computing systems, mentioned in description of FIG. 1, in several different ways. For example, the method 300, described herein, may be implemented using the call charging system 102, as described above.

The method 300, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 300.

The order in which the method 300 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 300 is described with reference to the call charging system 102, the description may be extended to other systems as well.

At block 302, for a call between a calling party and a called party, such as the first user 104-1 and the second user 104-2, subscription information regarding the discretionary charging feature is received. For example, a network entity associated with the first user 104-1, such as the O-SCP 112-1, is configured to receive subscription information pertaining to the discretionary charging feature, of the second user 104-2. For example, as disclosed earlier, a call charging communication module 108-2 can be configured to share dynamic charging information, relating to the discretionary charging feature, with the call charging communication module 108-1. The discretionary charging feature, for example, can be implemented in a T-SCP 112-2, or a call charging data 220-4, and the T-SSP 110-2 can be configured to query the T-SCP 112-2 for details pertaining to the discretionary charging feature.

At block 304, it can be ascertained whether the second user 104-2 is subscribed to the discretionary charging feature, based on the received subscription information. In an implementation, the O-SCP 112-1 can be configured to obtain and scan a party to charge parameter included in the dynamic charging information to determine whether the second user 104-2 is subscribed to the discretionary charging feature. In one example, based on a request identifier 222 value, the O-SCP 112-1 can be configured to ascertain whether or not the second user 104-2 is subscribed to the discretionary charging feature.

At block 306, the discretionary charging is applied to determine call charges for the first user. For example, once the dynamic charging information has been shared with the O-SCP 112-1, the O-SCP 112-1 can be configured to apply the discretionary charging for the determination of the call charges for the first user 104-1. In another example, a re-evaluation of an initially reserved charge, such as the charge blocked in a first time slice via the IDP 203, can be facilitated. Moreover, a refund of charges can be facilitated, according to the particular type of discretionary charging feature as subscribed to by the second user 104-2.

In an implementation, in the event that the first user 104-1 wishes to continue the call beyond the initial time slice duration, the revised charging policy as per the discretionary charging feature may be applied for all the time slices in the entire duration of the call to compute a total call charge for the first user 104-1. For example, if the second user 104-2 had subscribed to a 'free calling for calling party' feature, the entire charges that were reserved for the initial time slice, can be refunded to the first user 104-1. For subsequent time slices, the discretionary charging will be applicable, and the first user 104-1 may not be charged at all. In another example, if the first user 104-1 and the second user 104-2 are engaged in a video call, and the second user 104-2 is subscribed to the service based split charging feature, the first user 104-1 may be charged for one bearer service, and the second user 104-2 can be charged for the other bearer service. For example, if the discretionary charging feature specifies the first user is to be charged for the voice service, then the second user 104-2 can be charged for the video bearer service.

Although implementations for charging of calls in a communication network have been described in language specific to structural features and/or methods, it is to be understood that the appended claims are not necessarily limited to the specific features or methods described. Rather, the specific features and methods are disclosed as exemplary implementations for the charging of calls in a communication network.

The invention claimed is:

1. A method for charging of calls in a communication network, the method comprising:
   receiving subscription information pertaining to a discretionary charging feature, for a call between a first user corresponding to the calling party and a second user corresponding to the called party, wherein the first user is subscribed to a first telecom operator and the second user is subscribed to one of the first telecom operator and a second telecom operator;
   ascertaining whether the second user is subscribed to the discretionary charging feature based on the receiving; and
   via a call charging module, applying discretionary charging for determining call charges for the first user, based on the ascertaining;
   wherein the applying discretionary charging comprises re-evaluating an initially reserved charge of the first user based on the discretionary charging feature;
   wherein the discretionary charging feature indicator is at least a partially free calling for the first user, and wherein the partially free calling for the first user specifies refunding a portion of calling charge to the first user for the duration of the call.

2. The method as claimed in claim 1, wherein the ascertaining is based on a party to charge parameter associated with the discretionary charging feature.

3. The method as claimed in claim 1, wherein the party to charge parameter comprises a request identifier, a discretionary charging feature indicator, and at least one discretionary feature parameter.

4. The method as claimed in claim 1, wherein the ascertaining comprises determining a value of the request identifier to ascertain whether the second user has subscribed for the discretionary charging feature.

5. The method as claimed in claim 1, wherein the applying comprises determining the discretionary charging feature indicator and the discretionary charging feature parameter to compute the call charges for the first user.

6. The method as claimed in claim 1, wherein the applying discretionary charging comprises;
   re-evaluating an initially reserved charge of the first user based on the discretionary charging feature indicator and the discretionary charging feature parameter.

7. The method as claimed in claim 3, wherein the discretionary charging feature indicator is a completely free calling for the first user, and wherein the free calling for the first user specifies refunding an entire calling charge to the first user for the duration of the call.

8. The method as claimed in claim 3 wherein the discretionary charging feature indicator is a limited period charging, and wherein the limited period charging specifies one of charging the first user for a predetermined duration of the call and charging the second user for a remaining duration of the call, and charging the second user for the predetermined duration of the call and charging the first user for the remaining duration of the call.

9. The method as claimed in claim 3, wherein the discretionary charging feature indicator is a fixed charge call, and wherein the fixed charge call specifies charging the first user a predetermined amount for entire duration of the call, and charging the second user a balance amount for the duration of the call.

10. The method as claimed in claim 3, wherein the discretionary charging feature indicator is a service based split charging, and wherein the service based split charging specifies charging the first user for a first bearer service of a call, and charging the second user for a second bearer service of the call, when the call comprises at least two bearer services.

11. The method as claimed in claim 3, wherein the discretionary charging feature indicator is a charge sharing, and wherein the charge sharing specifies charging the first user and the second user according to a predetermined ratio for the duration of the call.

12. A call charging system for charging of calls in a communication network, the system comprising:
   a processor; and
   a memory coupled to the processor, the memory comprising:
   a call charging module configured to:
   receive a party to charge parameter from a call charging module associated with the second user, for a call between a first user corresponding to the calling party and the second user corresponding to the called party, wherein the first user is subscribed to a first telecom operator and the second user is subscribed to one of the first telecom operator and a second telecom operator;
   ascertain whether the second user is subscribed to a discretionary charging feature based on the party to charge parameter; and
   apply discretionary charging for determination of call charges for the first user, based on the ascertained subscription status and the party to charge parameter;
   wherein the call charging module is further configured to re-evaluate an initially reserved charge for the first user based on the discretionary charging feature, and wherein the call charging module is configured to refund a predetermined amount to at least one of the first user and the second user based on the re-evaluation.

13. The call charging system as claimed in claim 12, wherein the discretionary charging feature comprises at least one of a free charging for the first user, fixed charging for the first user, charge sharing between the first user and the second user, service based split charging between the between the first user and the second user, and a limited period charging.

14. A non-transitory computer-readable medium having embodied thereon a computer program for executing a method comprising:
- receiving subscription information pertaining to a discretionary charging feature for a call between a first user corresponding to the calling party and a second user corresponding to the called party, wherein the second user is subscribed to a first telecom operator;
- ascertaining whether the second user is subscribed to the discretionary charging feature based on the receiving, wherein the first user is subscribed to one of the first telecom operator and a second telecom operator; and
- applying discretionary charging for determining call charges for the first user, based on the ascertaining;
- wherein the call charging module is further configured to re-evaluate an initially reserved charge for the first user based on the discretionary charging feature, and wherein the call charging module is configured to refund a predetermined amount to at least one of the first user and the second user based on the re-evaluation.

* * * * *